（12） United States Patent
Bruck

(10) Patent No.: US 7,234,808 B2
(45) Date of Patent: Jun. 26, 2007

(54) GLASSES, IN PARTICULAR INDUSTRIAL SAFETY GLASSES

(75) Inventor: Stefan Bruck, Nuremberg (DE)

(73) Assignee: Uvex Arbeitsschutz GmbH, Furth (DE)

( * ) Notice: Subject to any disclaimer, the term of this patent is extended or adjusted under 35 U.S.C. 154(b) by 0 days.

(21) Appl. No.: 11/296,492

(22) Filed: Dec. 8, 2005

(65) Prior Publication Data

US 2006/0119789 A1    Jun. 8, 2006

(30) Foreign Application Priority Data

Dec. 8, 2004    (DE) .................. 10 2004 059 023

(51) Int. Cl.
G02C 1/08    (2006.01)
(52) U.S. Cl. .............................. 351/92; 351/95; 351/97
(58) Field of Classification Search .................. 351/41, 351/90–102
See application file for complete search history.

(56) References Cited

U.S. PATENT DOCUMENTS 1,922,766 A * 8/1933 Hurwitz ....................... 351/97
5,500,694 A * 3/1996 Roever et al. ................ 351/97
5,726,732 A * 3/1998 Kobayashi .................... 351/97
6,273,564 B1   8/2001 Wedeck et al.

FOREIGN PATENT DOCUMENTS

DE    80 17 007.6    12/1983
EP    1 460 470 A1    9/2004

* cited by examiner

Primary Examiner—Huy Mai
(74) Attorney, Agent, or Firm—Browdy and Neimark, PLLC

(57) ABSTRACT

In a pair of glasses, in particular industrial safety glasses, comprising a frame with side pieces which are articulated thereto by a side-piece projection; and two eyeholes with encircling grooves and sight pieces inserted in the grooves; the frame being divided in the vicinity of the eyeholes for expansion and exchange of the sight pieces and lockable in the closed position; and the frame being divided in the vicinity of the side-piece projection; it is provided that the side-piece projection, in prolongation of the divided area of the frame, is divided into a top projection of the top frame member and a bottom projection; and that a pivoted locking device is pivotably mounted on the top projection of the frame member and lockable in place by the bottom projection.

9 Claims, 4 Drawing Sheets

GLASSES, IN PARTICULAR INDUSTRIAL SAFETY GLASSES

BACKGROUND OF THE INVENTION

1. Field of the Invention

The invention relates to a pair of glasses, in particular industrial safety glasses, comprising a frame with side pieces which are articulated thereto by a projection, and two eyeholes with encircling grooves and sight pieces inserted therein, the frame being divided in the vicinity of the eyeholes for expansion and exchange of the sight pieces and lockable in the closed position by means of a locking device, the frame being divided in the vicinity of the side-piece projection, and the side-piece projection being divided in prolongation of the divided area of the frame into a top projection of the top frame part and into a bottom projection.

2. Background Art

Glasses of the generic type are known from EP 1 460 470 A1. A drawback of these glasses resides in the job of unlocking being rather complicated.

For durably optimal optical quality of the sight pieces, it is advantageous if they can be replaced after a certain time. Furthermore, possible replacement of the sight pieces enables the sight pieces to be adapted to the individual requirements of a certain user or to certain surroundings. For example, it is possible in this context to insert optically treated sight pieces, colored sight pieces or sight pieces with special surface properties. This possibility is especially important in sports glasses and industrial safety glasses where the frame design is comparatively complicated, owing to the required protection against bombardment.

To this end, the frame has been known to be divided and flexibly expanded for exchange of the sight pieces and for insertion of other sight pieces, after which the divided area is again bridged by a locking mechanism.

SUMMARY OF THE INVENTION

It is an object of the invention to embody a pair of glasses and a locking mechanism of the generic type in such a way that sight-piece exchange is easy to handle and that the design of the glasses is not affected by the replacement mechanism and that an especially reliable and durable interlocking system is produced.

According to the invention, this object is attained by a pivoted locking device being pivotably mounted on the projection of the top frame member and lockable in place by the bottom projection.

The divided portion is hermetically closed by a pivoted locking device according to the invention and the mechanical parts of the sight-piece projection are entirely covered externally, which gives a positive aesthetic impression and protects the replacement mechanism against soiling, bombardment and other mechanical impairment. In this solution, the function element of the pivoted locking device becomes an element of design. Another advantage of the embodiment according to the invention consists in the sight pieces being individually replaceable.

In keeping with the invention, it can be provided that a side piece can be mounted on the rear end of the projection of the top frame member. Fundamentally, a head strap could be provided there just as well.

Preferably, the frame is divided approximately horizontally, having a step in the divided area which ensures even more accurate positioning upon assembly after the frame has been expanded, and overlapping the otherwise visible joint.

By advantage, the pivoted locking device comprises an attached sleeve by which it can be pushed from behind on the projection of the top frame member.

In this case, the pivoted locking device can be fixed axially by the front of the side piece on the one hand and by a step of the projection of the top frame member where it passes into the frame.

Preferably, the pivoted locking device, on its bottom side, comprises a locking projection which, when locked in place, backs up from below the bottom of the side-piece projection which can be equipped with a horizontal slit.

Details of the invention will become apparent from the ensuing description of a preferred exemplary embodiment, taken in conjunction with the drawing.

DESCRIPTION OF A PREFERRED EMBODIMENT

Figure 1:
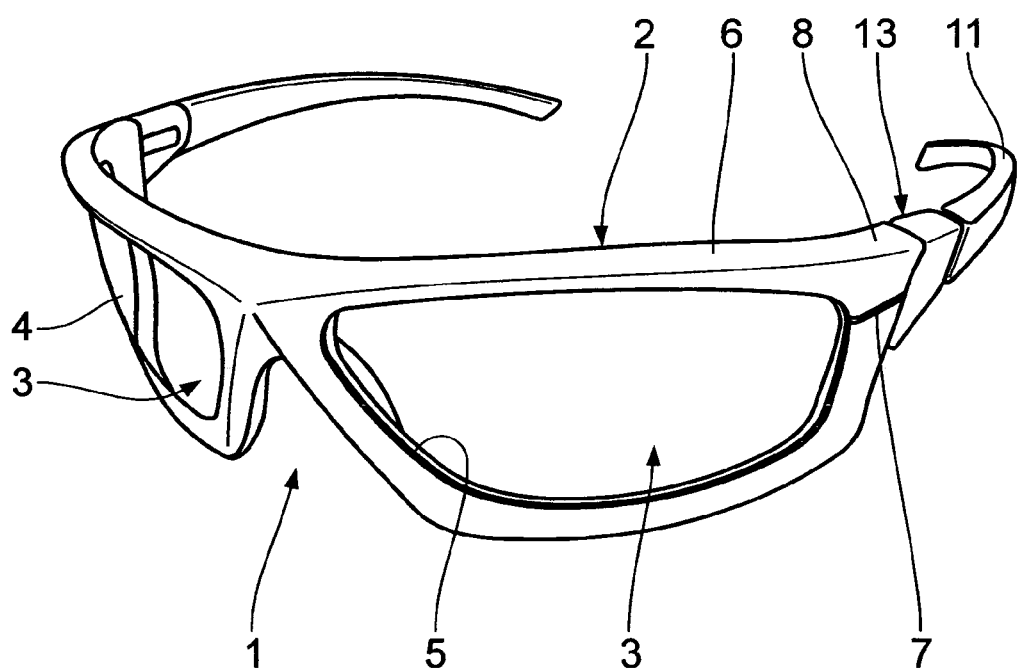
FIG. 1 is a perspective view of a pair of glasses according to the invention with the pivoted locking device closed.

A pair of glasses 1 seen in the drawing comprises a frame 2 with two eyeholes 3 and two sight pieces 4 which are inserted in encircling grooves 5 of the eyeholes 3.

Figure 3:
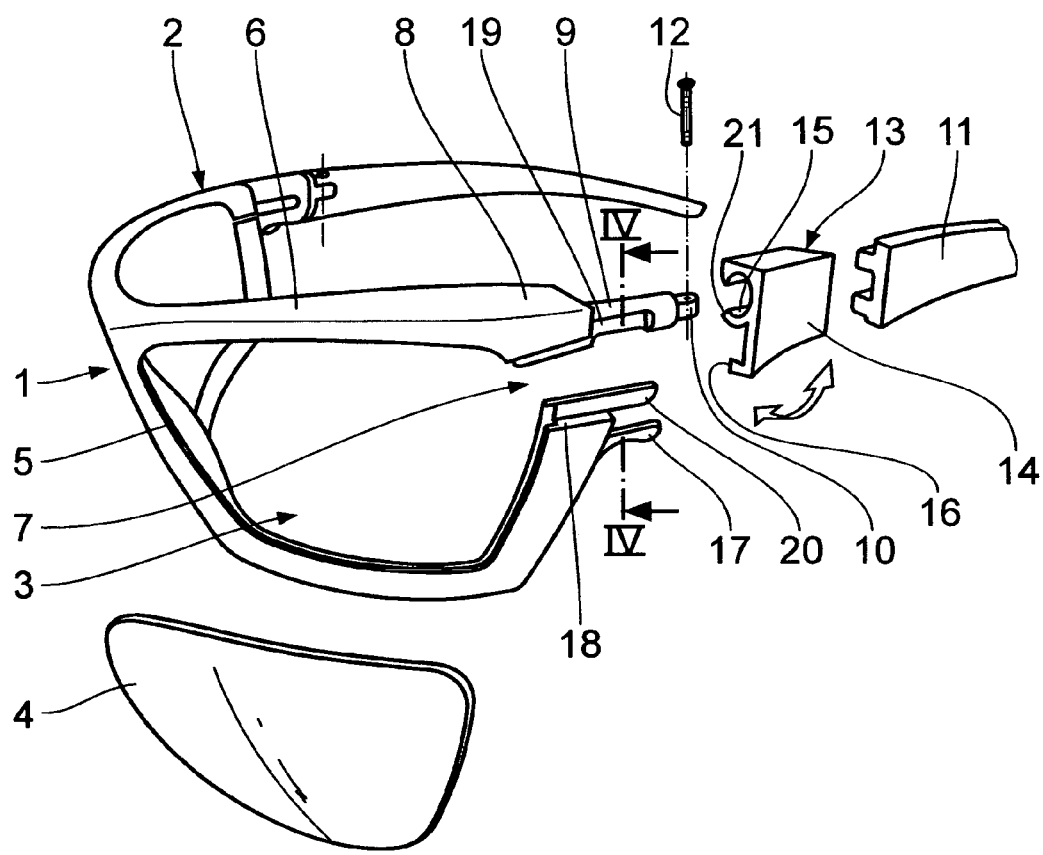
FIG. 3 is an exploded view of the interlocking area.

The frame 2 comprises a top frame member 6 and, externally below the top frame member 6, an approximately obliquely horizontal divided area 7 so that it can be flexibly expanded for removal and insertion of a sight piece 4 as seen in FIG. 3.

An approximately cylindrical projection 9 extends from the rear end 8, passing via a step into the rear end 8. In a manner known per se, an eyelet piece is provided on the rear end of the projection, forming a bearing for a side piece 11, with a rivet 12 being insertable into the eyelet piece 10, simultaneously constituting a kind of bearing pivot.

A pivoted locking device 13 comprises a plate-type basic structure 14, on the inward top side of which provision is made for an attached sleeve 15, by the aid of which to push the pivoted locking device 13 on to the projection 9 so that, after insertion of the rivet 12 and assembly, thus produced, of the side piece 11, the pivoted locking device 13 bears inwards against the step formed by the rear end 8.

The inward bottom end of the pivoted locking device 13 comprises a projection 16 which, when pivoted inwards, backs up from below a projection 17 for interlocking engagement with the frame 2.

In the divided area, the bottom member of the frame 2 comprises a step 18 by which to close a joint otherwise visible.

Figure 6:
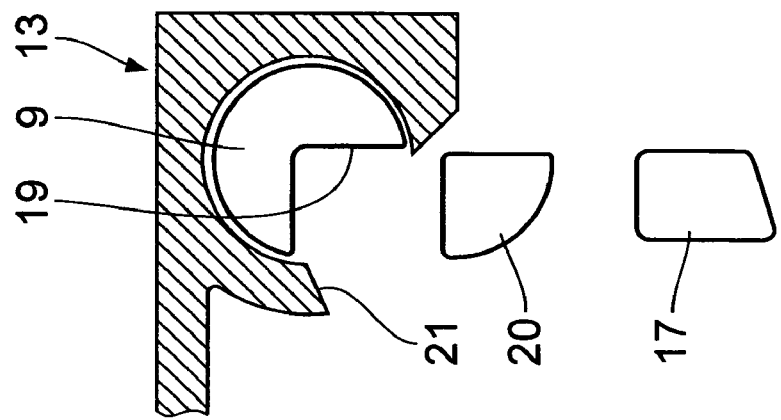
FIGS. 4 to 6 are sectional views of the pivoted locking device in various positions thereof.

The unlocking and, vice versa, interlocking process will be described in detail below, taken in conjunction with FIGS. 4 to 6 which are sectional views on the line IV—IV of FIG. 3.

Figure 4:
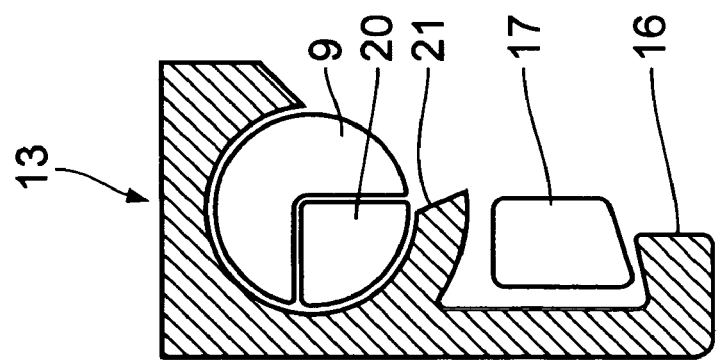

FIG. 4 illustrates the interlocked condition corresponding to FIG. 1, in which the locking device 13 is pivoted downwards. Noticeably, the projection 9 of the frame comprises a recess 19 of the cross-sectional shape of a quarter circle in which positively to insert an attachment 20, extending above the step 18, of the bottom frame member. The pivoted locking device 13 has a contour in the shape of a three-quarter circle, possessing a projection 21 which, in the closed condition, encompasses and backs up from below the projection 9 and the attachment 20. Another projection 16 is provided at a distance from the projection 21 which, in the closed condition, backs up from below the attachment 17.

Figure 2:
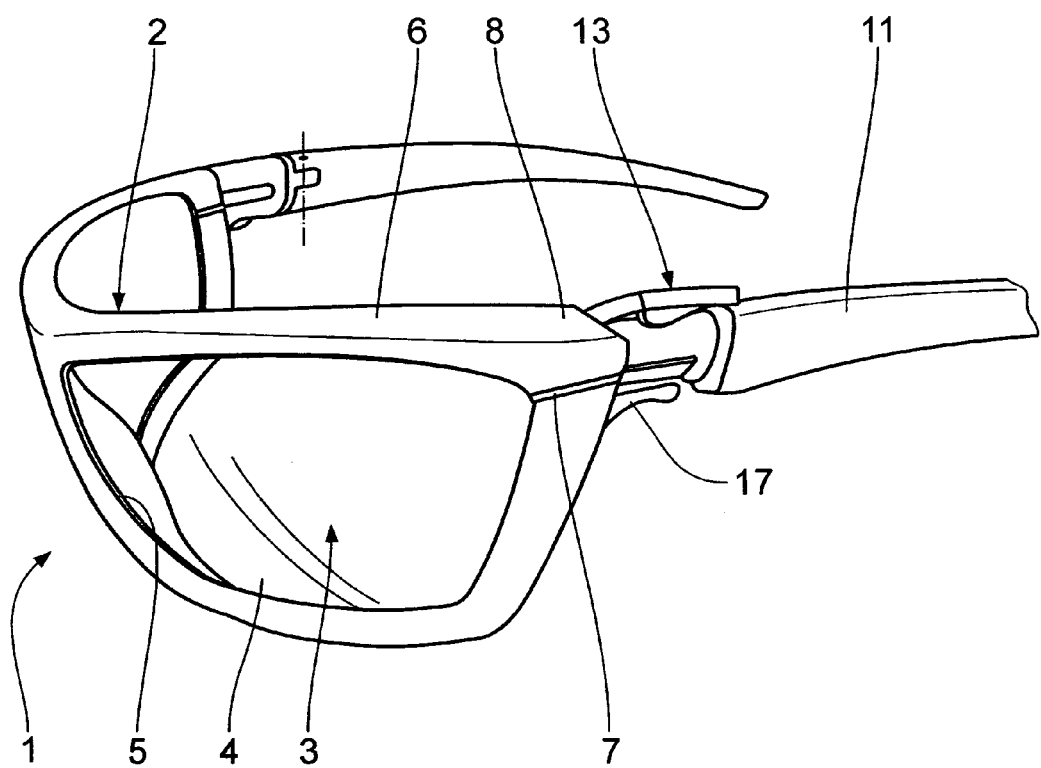
FIG. 2 is an illustration, corresponding to FIG. 1, with the pivoted locking device open.
Figure 5:
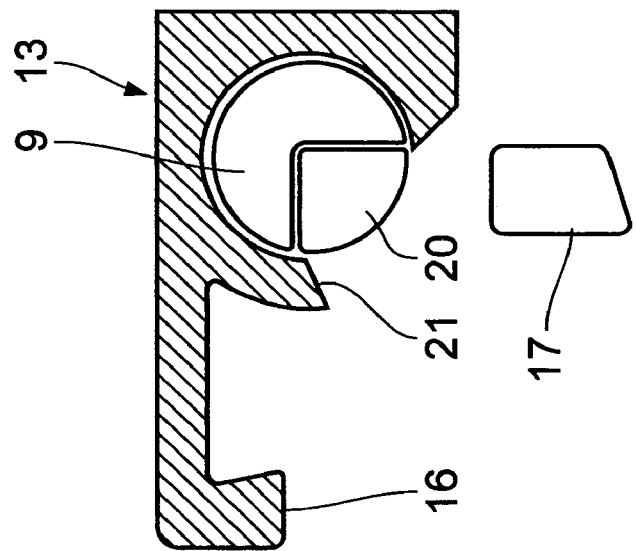

In FIG. 5, the locking device 13 is pivoted upwards by 90° for the frame 2 to be unlocked and expanded for exchange of a sight piece 4. In this way, the attachment 20 is released and, as seen in FIG. 2 and FIG. 6, the frame can now be flexibly expanded for removal and insertion of a sight piece 4.

What is claimed is:

1. Glasses, in particular industrial safety glasses, comprising:
    a frame with side pieces which are attached thereto by a side-piece projection; and
    two eyeholes with encircling grooves having sight pieces inserted in the grooves;
    the frame being divided in the vicinity of the eyeholes for expansion and exchange of the sight pieces and, in the closed position, being lockable by a locking device;
    the frame (2) being divided in the vicinity of the side-piece projection (9, 17) and the side-piece projection (9, 17), in prolongation of the divided area (7) of the frame (2), being divided into a top projection (9) of a top frame member (6) and a bottom projection (17);
    wherein a pivoted locking device (13) having an attached sleeve (15) is slidable from behind onto the projection (9) of the top frame member (6) by means of the attached sleeve (15) and is thereafter rotatable into locking engagement with the bottom projection (17).

2. Glasses according to claim 1, wherein a side piece (11) is mounted on the rear end (8) of the projection (9) of the top frame member (6).

3. Glasses according to claim 1, wherein the frame (2) is divided approximately horizontally and obliquely.

4. Glasses according to claim 1, wherein the frame (2) comprises a step in the divided area (7).

5. Glasses according to claim 1, wherein the pivoted locking device (13) is axially fixed by the front of the side piece (11).

6. Glasses according to claim 1, wherein the pivoted locking device, in a direction towards the respective sight piece, is mounted on the projection of the top frame member (8), defined by a step.

7. Glasses according to claim 1, wherein the pivoted locking device, on its bottom side, comprises a projection (16) which, in the interlocked condition, backs up from below the bottom of the projection (17).

8. Glasses according to claim 7, wherein the projection (17 comprises a horizontal slit.

9. Glasses according to claim 1, wherein the pivoted locking device is fixed in the open position by locking engagement.

* * * * *